UNITED STATES PATENT OFFICE 2,300,969

PRODUCTION OF ALKINOLS

Walter Reppe, Adolf Steinhofer, Hermann Spaenig, and Karl Locker, Ludwigshafen-on-the-Rhine, Germany, assignors, by mesne assignments, to General Aniline & Film Corporation, New York, N. Y., a corporation of Delaware No Drawing. Application August 20, 1940, Serial No. 353,390. In Germany September 7, 1939

5 Claims. (Cl. 260—635)

The present invention relates to the production of alkinols (alcohols of the acetylene series), i. e. alcohols containing a triple carbon linkage.

Numerous efforts have been made to prepare alkinols by condensing acetylene with aldehydes or ketones according to the formulae

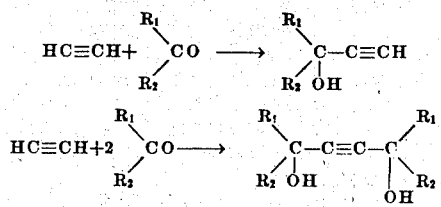

wherein $R_1$ and $R_2$ represent hydrogen or organic radicals. Until recently the condensation of aldehydes or ketones with acetylene was only possible by starting from the Grignard compounds of acetylene or from alkali metal compounds of acetylene or by working in the presence of alkali metal, alkali metal alcoholates or alkali metal amides. These condensations had to be carried out while carefully excluding water because otherwise the starting materials would be decomposed or converted into compounds unsuitable for the formation of alkinols. The preparation of alkinols by the above indicated processes has therefore presented considerable difficulty and numerous expedients have been proposed to overcome this.

Another method has been proposed to replace these processes. In this method the acetylides of the heavy metals of the first and second group of the periodic table are used as catalysts to bring the direct condensation of acetylene and aldehydes or ketones. In particular, copper acetylide has proved suitable for example in the production of alkinols from acetylene and aldehydes, especially formaldehyde. When operating discontinuously, copper acetylide or a copper compound capable of forming copper acetylide is added to an aqueous solution of formaldehyde and acetylene is led in, preferably under superatmospheric pressure and admixed with an inert diluent gas. In order to promote the reaction, the reaction mixture is heated to moderately elevated temperatures, say to from 60 to 120° C. When acetylene is no longer absorbed, the mixture is allowed to cool, filtered off and the alkinols formed are separated from the filtrate by distillation. When using the catalyst repeatedly, it will be found that its activity has decreased.

In large scale operations, it is preferable to carry out the reaction continuously by leading acetylene in a cycle through a reaction vessel wherein the copper acetylide is rigidly arranged, preferably coated to carriers. Together with or in counter-current to the acetylene a solution of formaldehyde is led through the vessel. When operating in this manner, it will be found that after some time the copper acetylide loses its activity, and that side-reactions occur which decrease the yield of alkinols.

It is an object of the present invention to provide a method of preparing alkinols from acetylene and aldehydes or ketones, in particular from acetylene and formaldehyde, whereby the activity of the copper acetylide catalyst and the good yield of alkinols are maintained for a long time. In order to obtain such result we have found that the acetylene should be brought into contact with the aldehyde or ketone and copper acetylide in the presence of substances capable of preventing the formation of cuprene.

The substances employed in the execution of the present invention preferably comprise one or a plurality of the elements gold, mercury, lead, antimony, bismuth, selenium, cerium, bromine or iodine or their compounds. These elements may be used in their elementary form provided that they do not react with acetylene by altering the acetylenic linkage, as for example do free bromine or iodine. The said elements may also be used in form of their compounds provided that these compounds do not add to the triple linkage of acetylene. Especially good results are obtained by using compounds which contain more than one of the above listed elements, e. g. the iodides of mercury, lead or bismuth. Among other suitable compounds there may be mentioned mercury oxide or phosphate, bismuth oxide or hydroxide, bismuth oxynitrate, selenium-sulfur, selenium dioxide, the iodides of potassium, copper or silver.

The substances preventing the formation of cuprene may be dissolved or suspended in the reaction liquid. They may also be applied to carriers rigidly arranged in the reaction vessel, preferably applied to the carrier together with the copper acetylide catalyst.

The following specific examples are introduced for the purpose of illustrating preferred modes of executing the present invention. It is to be understood that it is not our intention to limit the same to reactants therein employed or to the operating conditions described. The parts are by weight unless otherwise stated.

Example 1

A mixture containing 50 parts of a 30 per cent aqueous formaldehyde solution, 3 grams of copper and 0.25 part of calcium carbonate are heated in a pressure-tight stirring vessel to 110° C. A mixture of acetylene and nitrogen (ratio by volume 3 : 1) is pressed in until the pressure amounts to 20 atmospheres. Fresh acetylene is pressed in corresponding to the amount of acetylene absorbed. When acetylene is no longer absorbed the reaction mixture is filtered off leaving 18 parts of a brown-red mixture of copper and cuprene. The filtrate is distilled in fractions. There are obtained unchanged formaldehyde and water and butine-2-diol-1.4 in a yield of 4 per cent calculated on the amount of formaldehyde used.

The reaction is repeated under otherwise identical conditions while adding to the starting mixture 0.3 part of mercury oxide, or bismuth hydroxide, or potassium iodide or bismuth oxyiodide or selenium-sulfur. When working up the reaction in the manner described above, no cuprene is found and the yield of butine-2-diol-1.4 amounts to from 18 to 20 per cent when mercury oxide is used.

The copper and the substance preventing cuprene formation may be used repeatedly without cuprene being formed and the yield being decreased.

The following table shows the yields obtained with other substances:

| Substance added | Yield of butine-2-diol-1.4 |
|---|---|
| | Per cent |
| Potassium iodide | 56 |
| Bismuth hydroxide | 46 |
| Bismuth oxyiodide | 78 |

*Example 2*

The reaction is carried out in a pressure-tight tower made from stainless steel (900 centimeters length and 12 centimeters internal diameter) which has been charged with 70 liters of a catalyst prepared in the following manner:

Cylindrical silicic acid gel particles of 4 millimeters diameter and 10 millimeters length are impregnated with a saturated aqueous solution of copper nitrate, dried and heated to 500° C. until nitrogen oxides are no longer evolved. Silicic acid particles are thus obtained containing a coating of 13 per cent of copper.

Over this catalyst there are allowed to trickle at from 100° to 110° C. per hour 15 kilograms of a 30 per cent aqueous formaldehyde solution. Simultaneously, an excess of acetylene is led in the same direction in a cycle under a pressure of 5 atmospheres. At the bottom of the tower an aqueous solution of butine-2-diol-1,4 is drawn off. After some time the activity of the catalyst is weakened so that the amount of formaldehyde solution introduced per hour has to be decreased. After 10 days the tower is plugged by the formation of cuprene.

The reaction is repeated under otherwise identical conditions while using a catalyst prepared in the following manner: 70 liters of silicic acid cylinders are impregnated with a solution of 16 kilograms of copper nitrate and 3.2 kilograms of bismuth nitrate in dilute nitric acid. After drying and heating to 500° C., the cylinders are impregnated with a solution of 85 grams of ammonium iodide in 2 per cent acetic acid and again dried at 300° C.

This catalyst remains effective for a long time so that after 15 weeks the tower was still free from cuprene and the yield of butine-2-diol-1.4 was still as high as at the beginning of the reaction.

Although we prefer to prepare the copper acetylide catalyst within the reaction vessel from copper or copper compounds and acetylene, an alternative procedure is to impregnate carriers with copper acetylide in a separate process, for example by introducing acetylene into a solution of cuprous chloride or copper acetate in the presence of an agent capable of binding the acid and of a carrier substance.

The process is ordinarily carried out in aqueous medium at temperatures from normal to 150° C., a temperature of about from 100 to 120° C. being preferred. Instead of or in addition to water an inert organic diluent may be used. In case the formaldehyde solution used contains free acid, compounds capable of binding acids, such as calcium or magnesium carbonate, sodium bicarbonate, or magnesium oxide may be used. The reaction should be carried out in weakly acid or neutral solution, when starting from aldehydes. When using ketones, the reaction may also be weakly alkaline. The hydrogen ion concentration, therefore, is advantageously kept between about pH=2.5 and pH=12.

What we claim is:

1. In the process of producing alkinols by the interaction of acetylene and a member of the group consisting of aldehydes and ketones in the liquid phase and in the presence of copper acetylide, the step which comprises performing the reaction in the presence of a compound of bismuth.

2. In the process of producing alkinols by the interaction of acetylene and aldehyde in the liquid phase and in the presence of copper acetylide, the step which comprises performing the reaction in the presence of a compound of bismuth.

3. In the process of producing alkinols by the interaction of acetylene and an aldehyde in the liquid phase and in the presence of copper acetylide, the step which comprises performing the reaction in the presence of a halogen compound of bismuth.

4. In the process of producing alkinols by the interaction of acetylene and formaldehyde in the liquid phase and in the presence of copper acetylide, the step which comprises performing the reaction in the presence of an iodine compound of bismuth.

5. In the process of producing alkinols by the interaction of acetylene and formaldehyde in the liquid phase and in the presence of copper acetylide, the step which comprises performing the reaction in the presence of a bismuth oxide.

WALTER REPPE.
ADOLF STEINHOFER.
HERMANN SPAENIG.
KARL LOCKER.